Aug. 15, 1933. C. THIDE 1,923,042
MOTION PICTURE CHANGE-OVER AND CUT-OFF DEVICE
Filed March 30, 1927  2 Sheets-Sheet 1
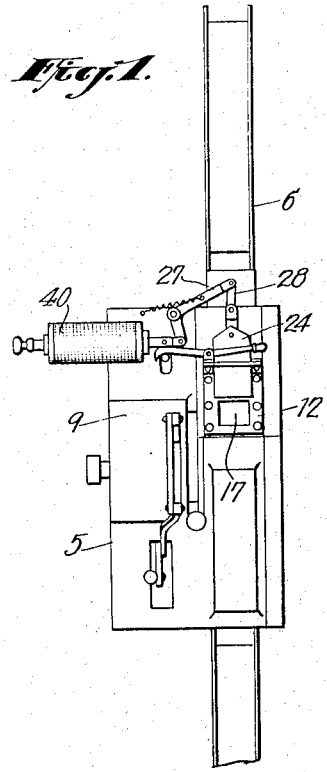
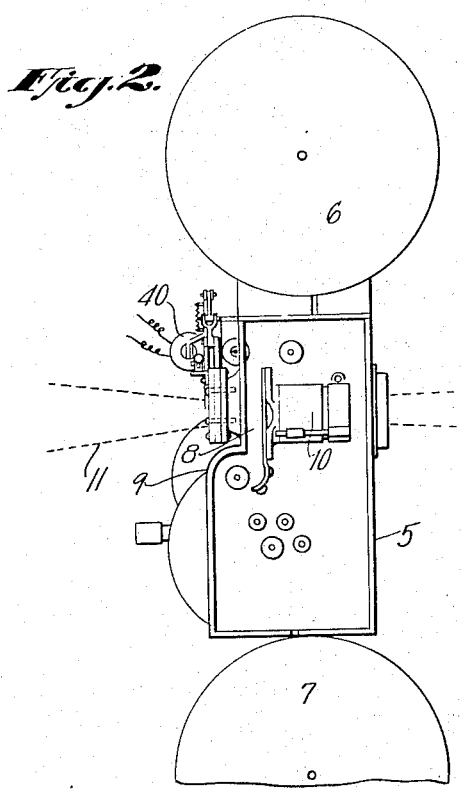
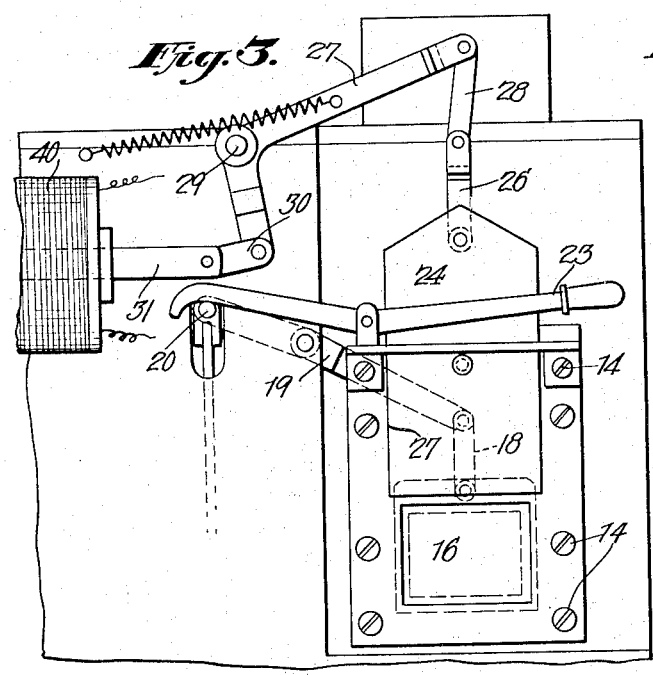
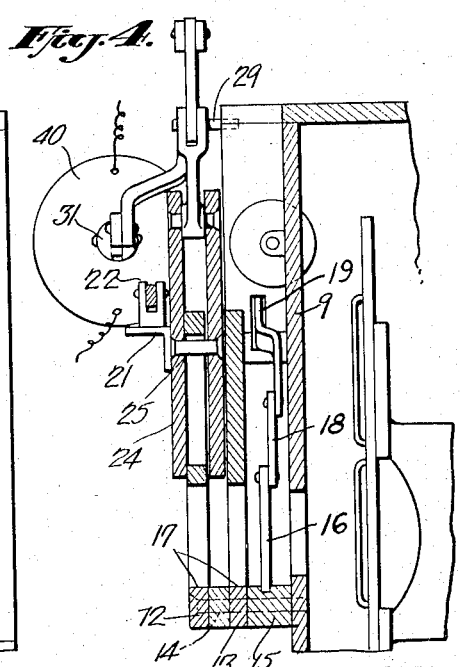
INVENTOR
Charles Thide.
BY
Richard B. Owen
ATTORNEY

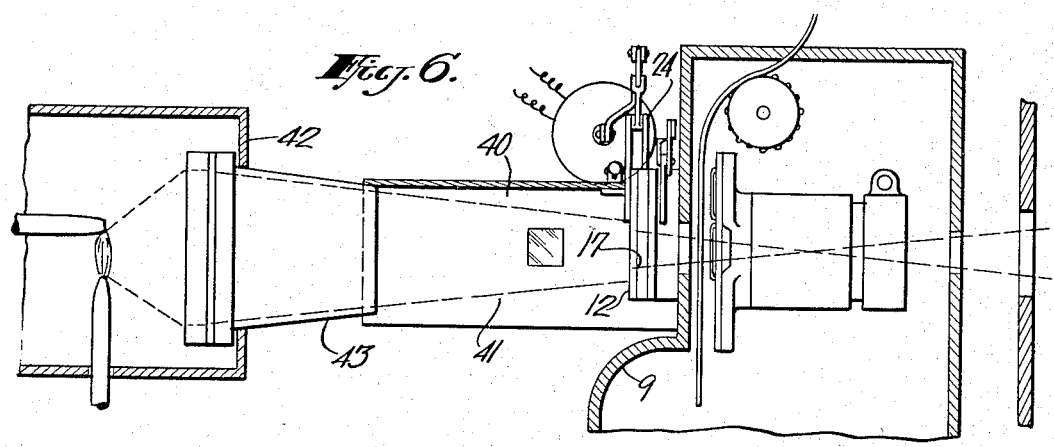
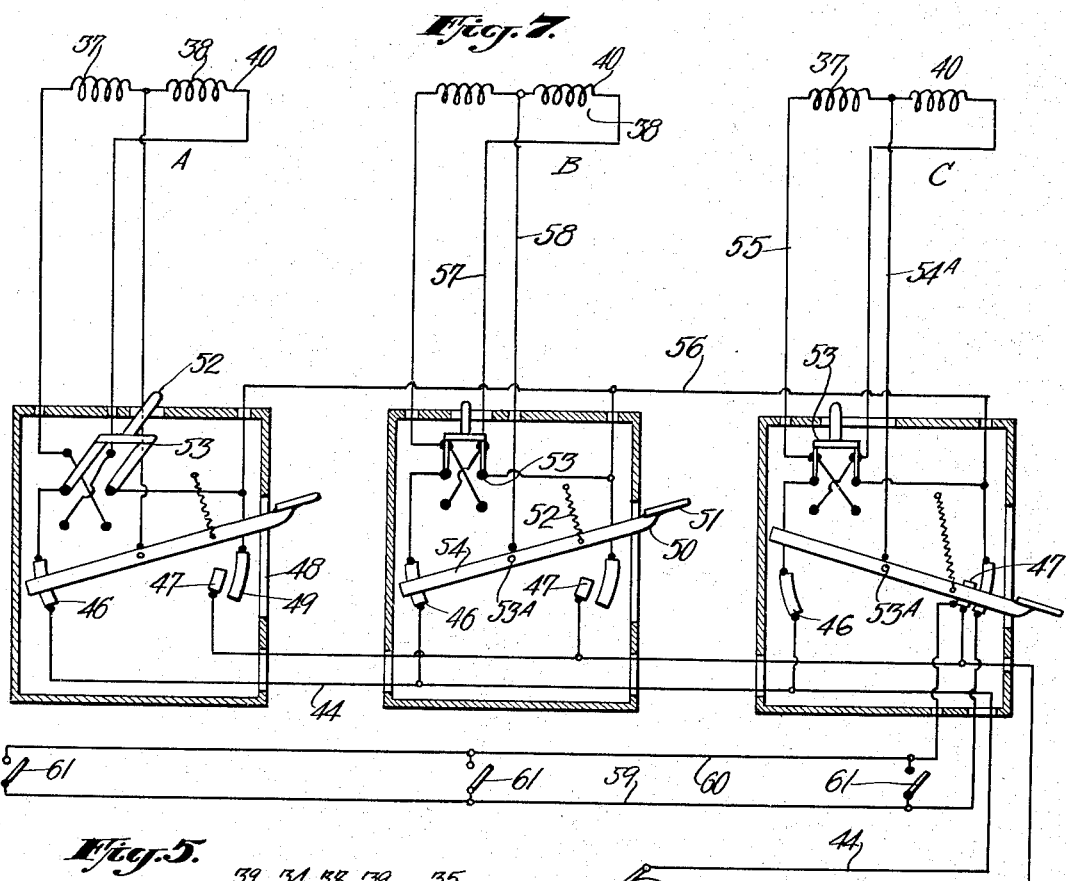
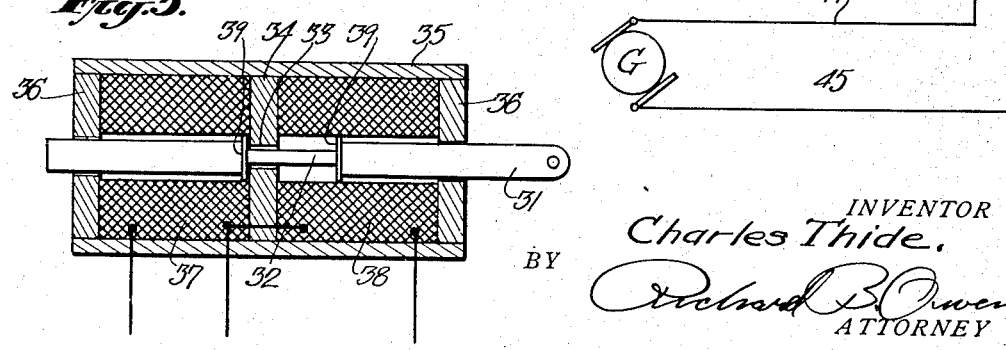

Patented Aug. 15, 1933

1,923,042

UNITED STATES PATENT OFFICE 1,923,042

MOTION PICTURE CHANGE-OVER AND CUT-OFF DEVICE

Charles Thide, Brooklyn, N. Y.

Application March 30, 1927. Serial No. 179,673

5 Claims. (Cl. 88—17)

This invention relates to motion picture change-over and cut-off devices and in particular to one which is positioned at the most advantageous point in the projection apparatus.

A most important object of the invention is to provide a change-over which functions between the light source and the film at a point where the beam is narrower in cross sectional diameter than it is at the front extremity of the lamp house cone or immediately in front thereof.

Another object of the invention is to provide a cut-off or shutter device which will make use of a very small piece of material which will intercept the light beam either before or behind an aperture through which part of the light beam passes before reaching the film, the aperture being smaller in area than the cross sectional area of the light beam at the point where the aperture is placed.

A still further particular object of the invention is to provide a change-over device which does not confine the light beam to the lamp house but prevents the light beam from reaching the film and also reduces the fire hazard, the change-over or shutters being of smaller dimension than heretofore used in order to cut off the light beam and therefore requiring the expenditure of less power to move the same through the smaller distances required during a change-over or cut-out.

Another particular object of the invention is to provide an electrically operated change-over or cut-out device which requires a minimum amount of wiring and which, in fact, is operated by a three wire circuit leading to a switch box, each of the switch boxes operating any of a series of change-over devices which may be connected electrically with a minimum of wiring to not only reduce the fire hazard but to reduce the expense of wiring up a battery of projectors so that cut-off and change-over may be made electrically from any convenient location in the operator's booth.

A still further object of the invention is to provide a solenoid operated cut-off shutter or change-over device which may be operated through a suitable switch and at a remote point, the mechanism employed being adaptable to a combination of projectors so that one may be opened and the other closed during the change-over instantaneously.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view in rear elevation of a motion picture projecting apparatus having positioned thereon a cut-off device which is operable by a solenoid and is so positioned on the projector that small movement thereof will effectively and quickly cut off the light beam entering the projector.

Figure 2 is a view in side elevation of the projector shown in Figure 1 illustrating the position of the cut-off device relatively to the rear wall of the projector housing.

Figure 3 is an enlarged view in front elevation of the cut-off and change-over device showing the small aperture permissible when the cut-off device is placed on the rear wall of the projector housing and in position to intercept the beam at the most advantageous point.

Figure 4 is a view in side elevation of the cut-off device showing how the same is positioned on the rear wall of the projector housing and how the shutter thereof is effectively operated by the solenoid.

Figure 5 is a view in longitudinal section of the solenoids used to operate the cut-off device.

Figure 6 is a view in side elevation a part thereof being shown in section to more clearly illustrate the invention of the lamp housing, the protector hood, cut-off device and the projector head, the illustration being primarily to show the positioning of the change-over or cut-off device with relation to the beam of light.

Figure 7 is a wiring diagram and switch shown diagrammatically to illustrate how each of the change-over and cut-off devices may be operated in combination and selectively to suit any conditions desired.

Referring to the drawings in detail, 5 indicates the usual projector head having positioned on the upper and lower ends thereof the film reels 6 and 7, from which the film is fed into the projector head 5 and through the space 8, between the rear wall 9 of the projector and the rear end of the lens barrel 10, at which point the beam of light 11 passes through the film and is projected upon the screen, in the usual manner.

In carrying out my invention, I have provided on the rear wall 9 of the projector housing, the spaced cooling plates 12 and 13, which, as shown in Figure 4, are the front and rear plates respectively and are made from asbestos or heat resistant composition, the object being to position these plates 12 and 13 so that they are in the path of the light ray and absorb the heat and prevent the projector housing from getting hot. These plates 12 and 13 are held in spaced relation through the medium of the pins or rivets 14 and are in turn, held in spaced relation with the wall 9 of the projector housing through the medium of suitable blocks or strips 15 which are positioned between the inner plates 13 and the wall of the projector housing and are secured to the latter in any suitable manner, such, for instance, as by the pins or rivets 14, before referred to.

Of course, I am aware that cooling plates of one sort or another have been used on the projector housing adjacent the auxiliary cut-off 16 which is used to intercept the beam of light so that it will not reach the film but I have devised a cut-off device which is so placed relatively to an aperture that it functions at a point where the beam is narrower in cross sectional diameter than it has heretofore been possible to attain and in this way I obtain a more complete cut-off and an invisible change-over besides conserving power and reducing the fire hazard. The plates 12 and 13 are provided with the aperture 17 behind which the auxiliary cut-off plate 16 operates in the space between the plate 13 and the rear wall 9 of the projector head. This plate 16 is connected through the medium of a vertical link 18 with a pivoted arm 19 which has heretofore been operated through the medium of a projecting pin 20 which extends through the rear wall of the housing and which was adapted to be operated by the motion picture operator to raise and lower the plate 16. In order to facilitate this operation, I have provided on the cooling plate 12, an extended bracket 21 on which is carried a standard 22 in which is pivotally held an operating lever 23, the end of the operating lever engaging the pin 20 and thereby operating the cut-off plate 16.

In providing the cut-off shutter which is also made of a heat resisting material, I may make use of a single sheet of material or may make the shutter double, and as shown in Figure 4, have carried out this construction so that the two plates 12 and 13 will act as a guide for the shutter 24 in its upward and downward movement. In this instance, the shutter 24 is double walled and its parts are connected through the medium of suitable rivets 25, the upper of which forms a pivot point for the upwardly extending link 26 and the lower of which forms a limiting stop for the upward and downward movement of the shutter 24 by reason of the fact that it is disposed within the cut-out portion 27 of the plate 12.

It is evident through the use of this construction that the aperture 17 is completely cut off by the downward movement of the shutter 24 and it is also evident that only a slight downward movement of the shutter 24 is necessary to close the small aperture 17 which is made use of in my present construction. The upper end of the link 26 is connected to a bell crank 27 through the medium of a link 28, the bell crank 27 being in turn pivoted as at 29 to an extended portion of the rear wall 9 of the projector head housing, the short arm of the bell crank 27 being connected through the medium of a link 30 to the outer end of the solenoid core 31. The solenoid core 31, as shown in Figure 5, is reduced at its mid portion as at 32 so it passes through the opening 33 in the dividing wall 34 which is disposed centrally of the solenoid which is made in the usual manner and consists of an outer sleeve 35 closed at its ends as at 36 and containing the usual wire coils 37 and 38, which are electrically connected to suitable operating switches to be hereinafter described. These solenoids, as is well understood, are provided with a double winding 37 and 38 which causes movement of the core 31 back and forth through the solenoid, depending upon which coil of the coils 37 and 38 is energized, the movement of the solenoid core 31 being limited by the reduced portion 32 thereof, the ends adjoining said reduced portion 32 being provided with suitable leather washers 39 which prevent noise when the solenoid is projected in one direction or the other and comes into contact with the dividing center wall 34.

With respect to the change-over device, it is seen therefore, that I have provided a douser positioned to take advantage of the smallest aperture between the light source and the film whereby the closing of which will effectively shield the film from the light and also, due to its small movement necessary in closing, will conserve the current used in the solenoid core and therefore make for more efficient and economical operation, besides reducing the fire hazard by completely cutting off and insulating the light beam from the projector head, and film.

In the operation of a series of cut-off or change-over devices, I have provided a novel feature by way of three wires leading from each solenoid and operating through a suitable switch which may be connected up electrically to any other number of switches which operate their respective solenoids and in the position shown in Figure 7. I have illustrated a combination of three solenoids diagrammatically and the cores of which are numbered 37 and 38 of each of the solenoids 40. The switches connected to each of the solenoids being operable selectively to change over from any one machine to the other, the machines positioned being designated as A, B and C, in Figure 7, for convenience in describing. It is evident that the placing of the solenoids and the shutter on the rear wall 9 of the housing of the projector will, as shown in Figure 6, operate the cut-off device which is positioned adjacent thereto, function between the light source in the film at a point where the light beam is narrower in cross sectional diameter than it is at the front extremity of the lamp house cone, and in Figure 6 the projected beam of light is indicated by the numeral 41 as coming from the lamp house 42, the beam travelling through the cone 43 and being projected upon the cooling plate 12 and it will be noted that the aperture 17 in the cooling plate is smaller than the diameter of the light beam at the point where it strikes the plate 12 and thus the shutter may be operated through the aperture to effectively cut off the light beam.

In the wiring diagram shown in Figure 7, which illustrates diagrammatically the method of operating selectively the solenoid on each of a battery of three machines A, B and C, I have provided a source of current such as a generator G which is connected by the usual wires 44 and 45 to the contact pieces 46 and 47 respectively, in each of the switch boxes 48. The contacts 47 are bridged to other contacts 49 through the medium of a suitable lever 50, which extends beyond the switch box 48 and is provided with a foot portion 51, although it is understood that the switch may be operated by hand and is shown diagrammatically to illustrate its principle of operation, the switch 50 being held in its upward position normally through the medium of the spring 52, the switch being pivoted at its center as at 53A and being so arranged that its free end 54 will wipe the contact 46 when the spring is moved to its downward position as shown in the wiring diagram, associated with machine C.

In order to selectively operate any one of the solenoids connected with machines A, B and C, I have provided in the lines reversed polarity switches which may be incorporated within the switch box 48 so that their handles 51 extend outside the box for operating convenience, the polarity switch being designated in each instance by the numeral 53 and having its pivot point in circuits 44, 45 when any one of the switches 50 are pressed down to bridge the contact 47, 49.

As an illustration in the operation of the device, assuming that machine B is not operating but is next in order for projecting while the machine C is operating then, pressure on the switch 50 will bridge the contacts 47, 49 completing a circuit through the contact 47 from line 45 through the switch arm 50, through the wire 54A, then through the coil 37 of the solenoid 40 and down through the lead 55 through the contact 46 and back through the negative line 44. The coil 37 will be caused to operate to draw the core 31 into the coil and thereby close the shutter 24 by reason of the fact that the polarity switch 53 has connected the coil 37 in circuit with the lines 44 and 45 while the bent portion of the switch arm 50, which lies between its pivot point 53—A and rests on contact 49 will short circuit the coil 38 of the solenoid and hence the coil 37 being wound as it is, for the purpose of drawing the core into the solenoid will effectively operate, the current being shunted therethrough by the polarity switch 53, as described.

Of course, it is evident by inspection of the wiring diagram relating to machine A that no action takes place on machine A because the polarity switch is in its neutral position and no energization of the solenoid takes place although the current when bridged across 47 and 49 in the switch box of machine C, travels through the wire 56 and through the switch box of machine A through the contact 46 and back through wire 44 to the negative side of the generator. During the energization of the solenoid 40 on machine C, the energization of one of the coils of the solenoid 40 and machine B also takes place because the polarity switch 53 is closed and upon the closing movement of the plate 24 on machine C, it is desired to simultaneously open the shutter 24 on machine B so that a change-over may take place instantly which will, of course, be invisible to the audience, and in carrying out this feature, it is desirable to advance the core 31 by energization of the coil 38 on the solenoid 40 of machine B and this is carried out by throwing the polarity switch 53 to the position shown in the switch box 48 of machine B where it will bridge the contact of one side of the polarity switch in order to complete the circuit through the wire 57 to the coil 38 through wire 58 and through the switch arm 50 to wire 44 back to the source of current, thus completing the circuit and energizing the coil 38 to cause the advance of the core out of the solenoid to effectively open the shutter at the same instant that the shutter on machine C is closed.

In order to operate any of the machines from a remote point in the cabinet instead of using the foot switch, I have provided two additional wires 59 and 60 which are interposed in the main circuit 44, 45 and which bridge the contacts 47, 49 by closing any of the switches 61 interposed in the circuit formed by the wires 59 and 60. It is evident that these switches 61 may be of the push button variety and may be positioned adjacent each machine so that the operator, in the event that he has not time to reach a machine in which change-over is desired, and for which the polarity switch has been set, he may simply press one of the buttons and change-over will occur.

It is evident, therefore, that by a simplified wiring, a change-over between any two machines may be made, or in fact, between any combination of machines to produce complete cut-off, or change-over as the case may be, without the use of a multiplicity of wiring as has heretofore been required.

It is also evident that I have reduced the number of wires between the machines and the switches and have embodied the switches in a single casing whereby they can be efficiently manipulated and will, in themselves, reduce the fire risk, which is ordinarily of a high nature in connection with motion picture projector housings and the apparatus contained therein.

It is also evident that I have provided a cut-off device which functions between the light source and the film at a point where the light beam is narrower in diameter than it is at the front extremity of the lamp house cone so that the light is prevented from reaching the film by the smallest possible size of shutter which will intercept the beam either before or behind an aperture through which the light beam passes before reaching the film, it of course being understood that the aperture is smaller in area than the cross sectional area of the light beam at the point where the aperture is placed.

It is also evident that I have provided a change-over device which does not confine the beam to the lamp house but prevents it reaching the film, thereby giving a greater amount of fire protection.

It is also evident that I have provided a change-over device which makes use of a smaller shutter which operates through a smaller distance therefore rendering the change-over invisible to the audience as well as conserving the power necessary in operating the solenoid to cause cut-off by said shutter.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. In combination, a battery of three or more motion picture projectors, light projectors cooperating therewith, light beam cut-off shutters disposed between the light projectors and the picture projectors, solenoids for opening and closing each of said shutters, dual coils in said solenoids, a three-way power circuit common to all of the projectors, a switch for diverting the current through some of the solenoids and a selective reversed polarity switch for each of said solenoids whereby the current may be directed to each of the coils of each of the solenoids for causing opening or closing of the desired shutter.

2. In combination, a battery of three or more motion picture projectors, a light projector for each of the motion picture projectors, a shutter between each of the light projectors and the motion picture projectors, a dual coil solenoid for opening and closing each shutter, a three wire power circuit common to all of said projectors, a three wire solenoid coil circuit for each projector, switches interposed in the solenoid coil circuit each of which functions to selectively place any two of the solenoid coils in circuit and switches for hooking up the power and solenoid coil circuits whereby operation of the said two solenoids may be accomplished in unison.

3. In combination, a battery of three of more motion picture projectors, a light projector for each of the motion picture projectors, a shutter between each of the light projectors and the motion picture projectors, a plurality of solenoid coils for opening and closing each shutter, a three wire power circuit common to all the projectors used, a three wire solenoid coil circuit, for each projector, switches interposed in the solenoid coil circuit, for selectively placing any one of the coils of any one of the solenoids in circuit and switches for hooking up the power and solenoid coil circuits whereby operation of any of the desired solenoid coils may be accomplished selectively.

4. The combination with a battery of three or more motion picture projecting machines each comprising a housing having an aperture therein and a lighting member arranged to focus a beam of light toward and through said aperture, of a light beam cut-off shutter secured to said housing and disposed at the point where the light beam attains its smallest cross sectional diameter before passing through said aperture, solenoid coil for opening and closing the shutter, a three wire power coil circuit common to all the machines, a three wire solenoid coil circuit for each machine, a switch interposed in the solenoid coil circuit and a switch in the power circuit for transferring the power from the power circuit to the solenoid coil circuit and said switch in the solenoid coil circuit being operable to cause opening or closing of the shutter.

5. In combination, a battery of three or more motion picture machines comprising projector heads having apertures therein, light beam projectors arranged to focus the light beam through the apertures, light beam cut-off shutters between said light projectors and said picture projectors, the shutters being secured to the heads and being disposed at points where each of the light beams attains its smallest cross sectional diameter exterior of both of said projectors, dual solenoid coils for opening and closing each of the shutters, a three wire power circuit common to all the machines used, three wire solenoid coil circuits, switches interposed in the solenoid coil circuits each of which functions to selectively place any two of the solenoid coils in circuit and switches for hooking up the power and solenoid coil circuits whereby operation of the said two solenoid coils may be accomplished in unison, to operate their respective shutters.

CHARLES THIDE. [L. S.]